United States Patent
Haulick et al.

(10) Patent No.: US 8,019,454 B2
(45) Date of Patent: Sep. 13, 2011

(54) AUDIO PROCESSING SYSTEM

(75) Inventors: Tim Haulick, Blaubeuren (DE);
Markus Buck, Biberach (DE); Guido Kolano, Salach (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 1170 days.

(21) Appl. No.: 11/799,105

(22) Filed: Apr. 30, 2007

(65) Prior Publication Data
US 2008/0071400 A1    Mar. 20, 2008

(30) Foreign Application Priority Data

May 23, 2006    (EP) .................................... 06010674

(51) Int. Cl.
*G06F 17/00*    (2006.01)
(52) U.S. Cl. ......................................... 700/94; 701/211

(58) Field of Classification Search .................... 700/94; 701/211
See application file for complete search history.

(56) References Cited

U.S. PATENT DOCUMENTS
2005/0128106 A1*   6/2005   Nakaishi et al. .............. 340/988

FOREIGN PATENT DOCUMENTS
| | | |
|---|---|---|
| EP | 0809413 A | 5/1997 |
| EP | 0 809 413 | 11/1997 |
| JP | 2006 050083 | 2/2006 |
| JP | 2006 222686 | 8/2006 |
| WO | WO 2004/104520 | 12/2004 |

* cited by examiner

*Primary Examiner* — Walter F Briney, III

(57) ABSTRACT

An audio processing system controls an audio input signal. The audio processing system includes a signal analyzer that detects content information and source information corresponding to the audio input signal. The system generates an analyzed audio signal. A signal processor receives the analyzed audio signal and generates a processed audio signal based on the content information and/or source information.

25 Claims, 8 Drawing Sheets

US 8,019,454 B2

AUDIO PROCESSING SYSTEM

PRIORITY CLAIM

This application claims the benefit of priority from European Patent Application No. 06 010674.7, filed May 23, 2006, which is incorporated by reference.

BACKGROUND OF THE INVENTION

1. Technical Field

This disclosure relates to audio systems. In particular, this disclosure relates to a system for controlling audio signals in a vehicle.

2. Related Art

Drivers and passengers of vehicles receive audio information from various audio source devices in the vehicle. The devices, such as a navigation system, may provide direct information to the occupants, such as verbal navigational instructions or messages. The devices, such as a radio or CD player, may also provide non-direct information, such as music, news and programming.

The driver may be "overloaded" with audio information and noise, and may not be able to adequately distinguish important audio information from less important audio information. Important information may include the route guidance information. Less important information may include music. Such driver overload may distract to the driver and may cause the driver to miss desired or important information. Driver overload may create an unsafe or dangerous driving condition. Accordingly, there is a need for an audio system that informs the vehicle occupants of the relative importance of various audio information provided by the audio source devices.

SUMMARY

An audio processing system controls an audio input signal. The audio processing system includes a signal analyzer that detects content information and source information corresponding to the audio input signal. The system generates an analyzed audio signal. A signal processor receives the analyzed audio signal and generates a processed audio signal based on the content information and/or source information.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION OF THE PREFERRED EMBODIMENTS

Figure 1:
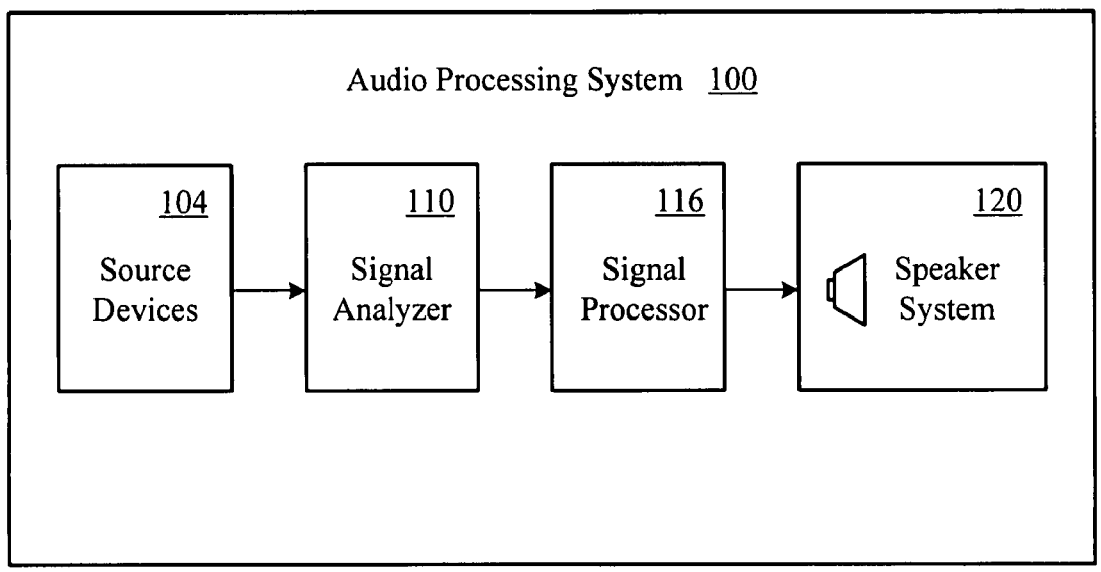
FIG. 1 is an audio processing system.
Figure 2:
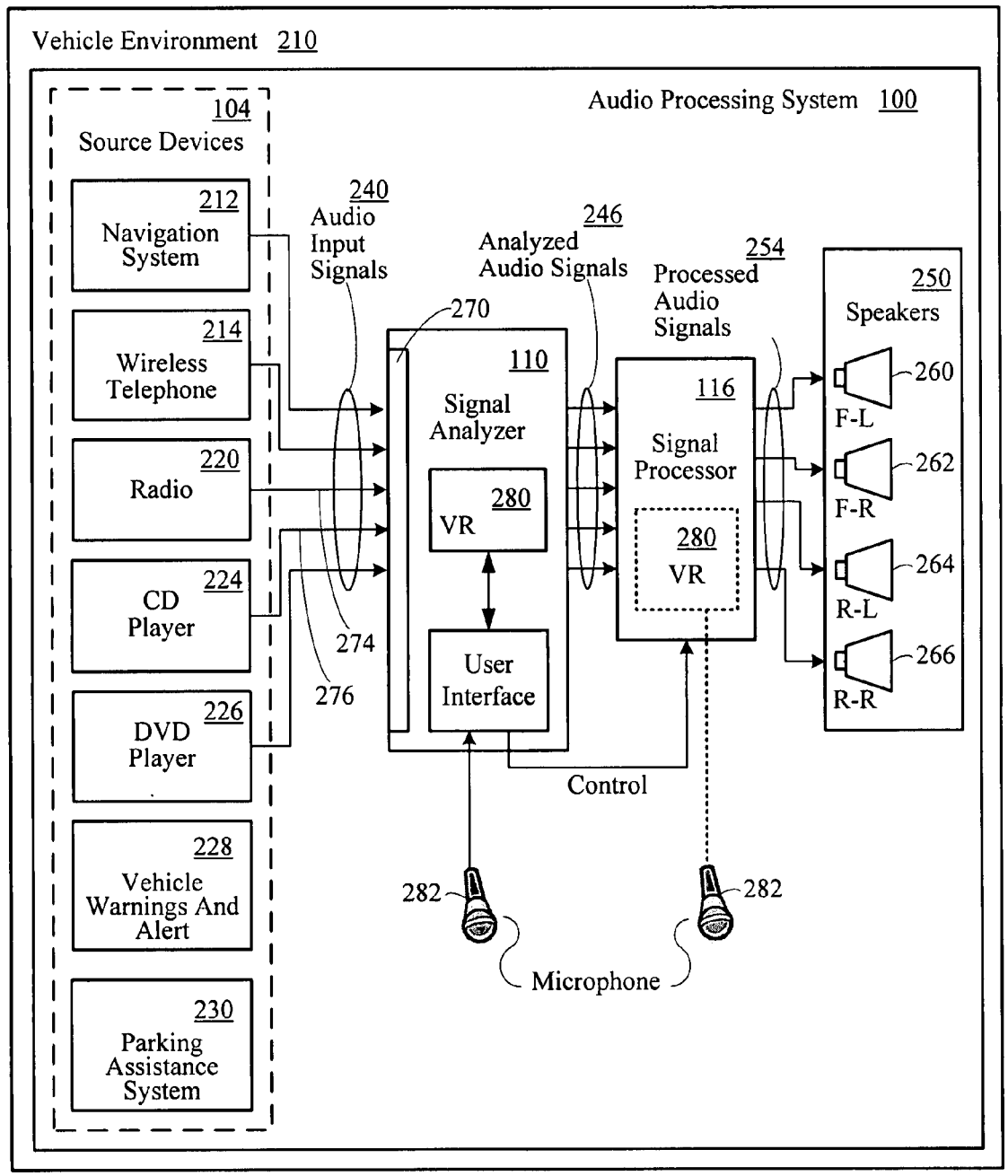
FIG. 2 is an audio processing system with multiple source devices.

FIG. 1 is an audio processing system 100. The audio processing system 100 includes source devices 104, a signal analyzer 110, a signal processor 116, and a speaker system 120. FIG. 2 shows the audio processing system 100 in a vehicle environment 210. The audio processing system 100 may include a plurality of source devices 104, such as a navigation system 212, a wireless telephone 214, a radio 220, a CD player 224, a DVD player 226, a vehicle warning and alert system 228, a vehicle parking assistance system 230 and/or other source devices. Some of the source devices 104 may be original equipment manufacturer (OEM) devices installed in the vehicle.

The signal analyzer 110 may receive audio input signals 240 from each of the source devices 104. The signal analyzer 110 may be a multi-channel input device capable of receiving and analyzing input signals 240 from the plurality of source devices 104. The signal processor 116 may receive the output signals 246 (analyzed audio signals) from the signal analyzer 110 and process the multiple audio signals. The signal processor 116 may connect to one or more loudspeakers 250 and provide audio output signals 254 (processed audio signals) to the respective loudspeakers. The loudspeakers 250 may include a front-left loudspeaker 260, a front-right loudspeaker 262, a rear-left loudspeaker 264, and a rear-right loudspeaker 266. The vehicle environment 210 may contain a greater number or fewer number of loudspeakers.

The signal analyzer 110 may determine the content and source of each of the audio input signals 240. The signal processor 116 may process each of the analyzed audio signals 246 received from the signal analyzer 110 based on the content and source identification of the respective signal. Based on the analyzed content and source identification of each analyzed audio signal 246, the signal processor 116 may modify the respective signal and transmit the processed audio signals 254 to the loudspeakers 250.

Drivers and passengers of vehicles may receive audio information from the various audio sources in the vehicle, such as from the navigation system 212, the wireless telephone 214, the vehicle warning and alert system 228, and the vehicle parking assistance system 230. Such source devices may provide directed or specific information to the occupants. For example, the navigation system 212 may provide verbal navigational instructions or messages to the driver, such as "turn left at next corner." The vehicle warning system 228 may inform the occupants of a specific condition, such as low tire pressure or a particular maintenance condition, for example, by issuing a tone or a series of tones.

The occupants may also receive non-directed information, such as music, news and other programming from the entertainment devices, such as the radio 220, the CD player 224 and the DVD player 226. The occupants may receive such acoustic information while communicating among each other in the vehicle environment 210. The vehicle environment 210 may be noisy, particularly when the vehicle is traveling at high speeds. Noise may be caused by wind, rain, engine noise, road noise, vibration, blower fans, windshield wipers and other internal or external sources.

The driver may be "overloaded" with various forms of audio information and noise, and may not be able to adequately distinguish between important audio information and audio information of lesser importance. Important or high-priority audio information may include the directed information, such as the route guidance information provided by the navigation system 212. Less important audio information may include the non-directed information, such as music provided by the CD player 224 or programming provided by the radio 220. Such driver overload may distract the driver and may cause the driver to miss desired or important information. Driver overload may create an unsafe or dangerous driving condition.

The signal analyzer 110 may determine the source of the audio input signal 240 received (source identification). Identification of the source of the audio input signal 240 may aid analysis of the content. In one application, the source of each audio input signal 240 may be determined based on the location of an input connector 270 to which the audio source device 104 is connected. Alternatively, the audio input signals 240 may be connector-independent, and each audio source signal may include an identification signal, such as an encoded identification signal. The encoded identification signal may identify the type or class of audio source device transmitting the signal. The signal analyzer 110 may assign a priority level to the audio input signal 240 based on the source identification. For example, an audio input signal 272 received from the navigation device 212 may be assigned a higher priority than an audio input signal 274 and 276 from the radio or CD player.

The signal analyzer 110 may analyze the content of the respective audio input signal 240 to determine the type of information transmitted by the source device 104. For example, the signal analyzer 110 may analyze the spectral envelope or other feature vectors of the signal. Feature vectors may include pitch, harmonic content and amplitude of the audio input signal 240.

Figure 3:
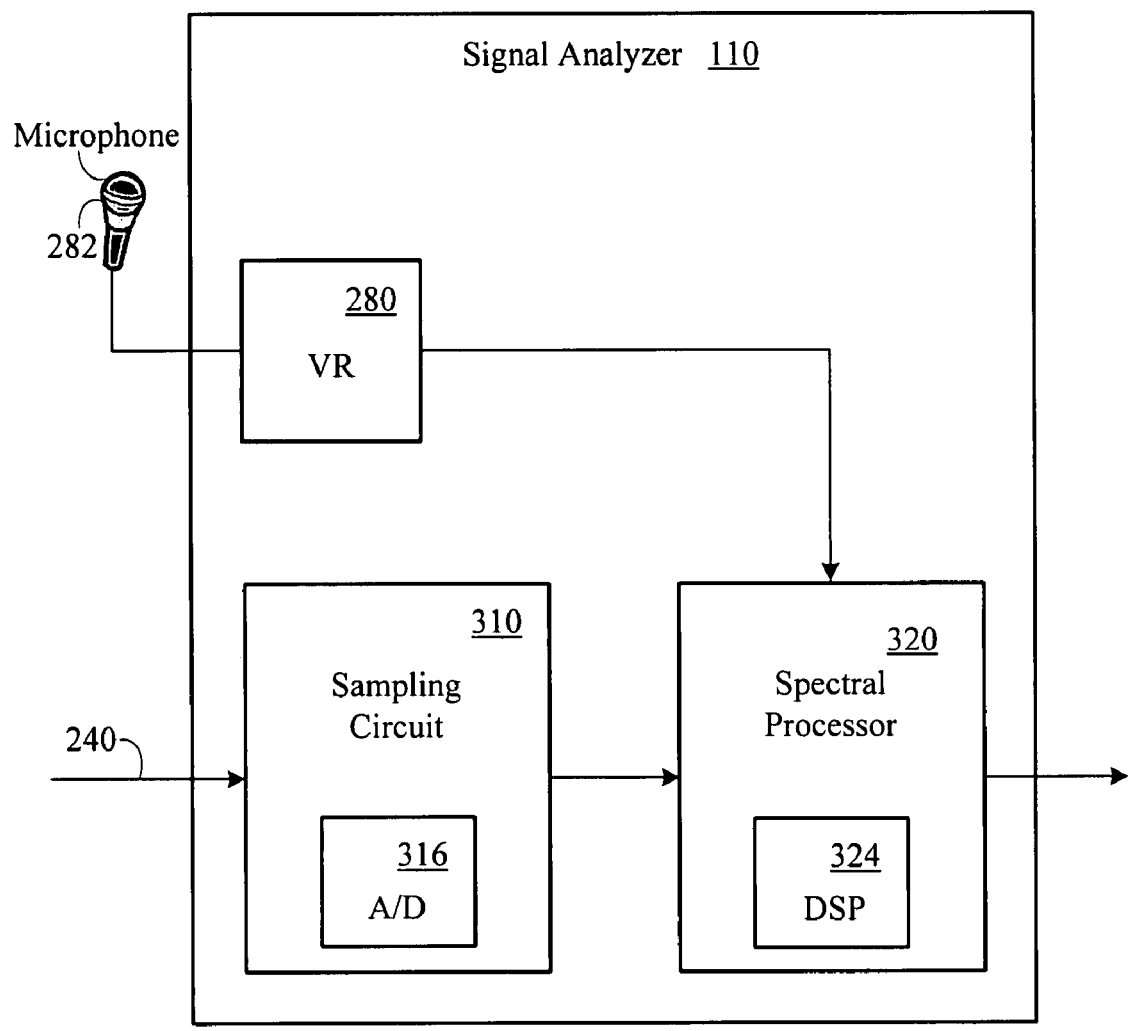
FIG. 3 is a signal analyzer.

FIG. 3 shows the signal analyzer 110, which may include a sampling circuit 310. The sampling system 310 may receive a plurality of audio input signals 240 from the audio input source device 104, and may convert the signal into digital form at a selected sampling rate. The sampling rate may be selected to capture any desired frequency content. For speech, the sampling rate may be approximately 8 kHz to about 22 kHz. For music, the sampling rate may be approximately 40 kHz. The sampling system may include an analog-to-digital converter (ADC) 316 to convert the analog signals from the audio input devices to sampled digital signals.

The signal analyzer 110 may receive one or more audio input signals 240 from one or more audio source devices 104 simultaneously. For example, the signal analyzer 110 may receive audio input signals 240 from the navigation system 212 and the radio 220. When audio signals from the navigation system 212 are received, the signal analyzer 110 may direct the signal processor 116 to transmit the processed audio signals 254 corresponding to the navigation system 212 to the loudspeakers 250, and block the signals corresponding to the radio 220.

A spectral processing circuit 320 may receive output from the sampling circuit 310. The spectral processing circuit 320 may process the audio input signals using a Fast Fourier Transform (FFT) or Discrete Fourier Transform (DFT). The spectral processing circuit 320 may transform the signal into a cepstral representation or into a line spectral frequency representation. The spectral processor may generate predictor coefficients based on the received signals and may process the received signals based on frames or blocks of data. Each frame or block of data may contain a predetermined number of samples. The spectral processing circuit 320 may identify the pitch, the formants, the mean signal power and the spectral envelope of the audio input signals 240. The spectral processing circuit 320 may include hardware and/or software, and may include a digital signal processor (DSP) 324. The DSP 324 may execute instructions that delay an input signal one or more additional times, track frequency components of a signal, filter a signal, and/or attenuate or boost an amplitude of a signal. Alternatively, the spectral processing circuit 320 or DSP 324 may be implemented as discrete logic or circuitry, a mix of discrete logic and a processor, or may be distributed over multiple processors or software programs.

Figure 4:
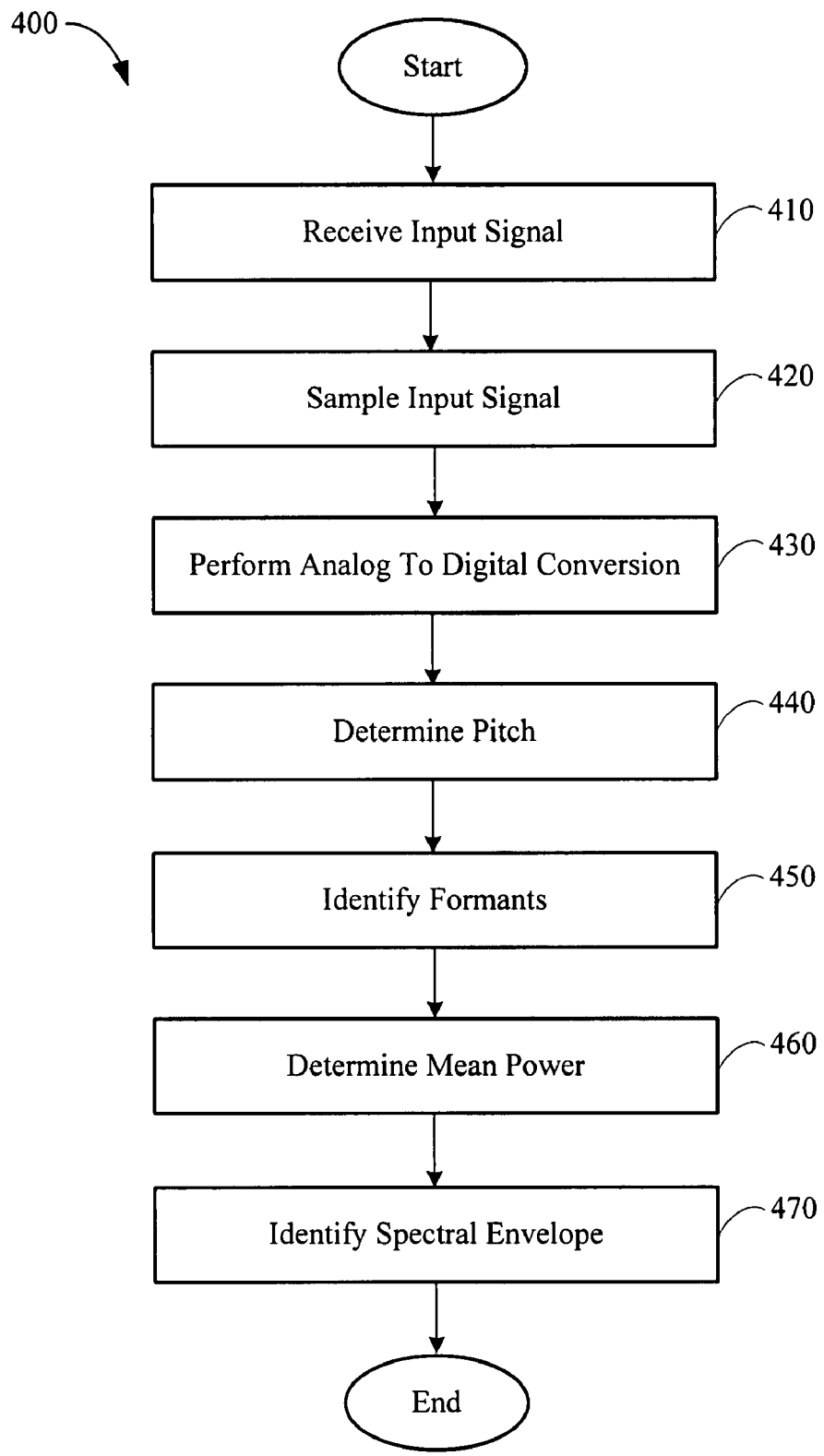
FIG. 4 is a control process.

FIG. 4 is a process (Act 400) for analyzing an input signal. The spectral processing circuit 320 may receive the input signal (Act 410) and sample the input at a predetermined sampling rate (Act 420). The sampled signal may be converted to a digital form by an analog-to-digital converter (Act 430). Using various techniques, such as Fourier transforms, the spectral processor may determine the pitch (Act 440), identify the formants (Act 450), calculate the mean signal power (Act 460), and identify the spectral envelope (Act 470) of the audio input signals.

The signal analyzer 110 may analyze the audio input signal 240 and assign or associate a type or class to the signal. The audio input signal 240 may be identified as a verbal message, such as a message from the navigation system 212. The audio input signal 240 may be identified as a tone signal, such as a warning tone from the vehicle warning system 228. The input audio signal 240 may be categorized according to a plurality of different characteristics.

The signal processor 116 processes the analyzed audio signals 246 processed by the signal analyzer 110. The signal processor 116 may perform specific processing based on information received from the signal analyzer 110, such as source and content information. The signal processor 116 may also perform specific processing based on instructions received by the signal analyzer 110. The signal processor 116 may route the audio input signals 240 to the loudspeakers 250 for output, and/or it may process the signals by adjusting the gain, tone, or other characteristics of the signals. The signal processor 116 may also delay or record the signal, or it may direct the signal to one or more specific loudspeakers so that one or more specific occupants may receive output from a specific loudspeaker. The signal processor 116 may block transmission of the corresponding signal, and may provide acoustic effects, such as reverberation and surround-sound. The signal processor 116 may also directly pass the signal to the loudspeakers 250 without modification.

The signal processor 116 may receive and process one or more (or all) of the audio input signals 240 from the plurality of source devices 104. Use of some source devices 104 may be mutually exclusive. Output from the radio 220 and the CD player 224 may be active separately in time. When multiple source devices are active simultaneously, the signal analyzer 110 may process the corresponding received audio input signals 240 and may provide instructions related to source content to the signal processor 116 regarding each of the corresponding signals.

Based on a type or a class of signal, the signal analyzer 110 may instruct the signal processor 116 to record or modify the audio input signal. The signal processor 116 may delay, buffer, or mute the audio input signal. For example, the signal analyzer 110 may recognize that the driver is driving in heavy traffic and should not be distracted. In this circumstance, the signal analyzer 110 may instruct the signal processor 116 to temporarily hold, buffer, or delay signals received from the wireless telephone 214.

The signal processor 116 may modify the audio input signal based on the content and source of the audio signal determined by the signal analyzer 110. For example, the volume of the processed audio signal directed to one or more specific loudspeakers may be modified based on the content and source of the audio input signal. The content may indicate the importance of the message transmitted. The navigation system 212 may transmit navigational instructions and may also transmit weather updates, traffic conditions and other information. The content of the audio input signal transmitted by the navigation system 212 may indicate "turn left in 500 meters." Accordingly, the signal processor 116 may increase the volume level or the pitch of the processed audio signal 254 to alert the driver that the message is important. If the content of an audio input signal transmitted by the navigation system 212 indicates a more immediate condition, such as "turn left in 50 meters," the signal processor 116 may increase the volume level and/or the pitch of the processed audio signal 254 to a greater degree.

The signal processor 116 may use an audio effect. For example, the signal processor 116 may add reverberation to the processed audio signal corresponding to the navigation system 212, and the amount of reverberation may be proportional to the analyzed content of the signal, such as the distance value contained in the transmission. Thus, the signal processor 116 may alter the volume of the signal based on the content of the signal to alert the driver of the importance of the transmission. For example, the content of an audio input signal transmitted by the navigation system 212 may indicate "turn left now." Accordingly, the signal processor 116 may direct the processed audio signal to be output by only the front-left 260 and/or the rear-left loudspeaker 264. The signal processor 116 or the signal analyzer 110 may include an optional voice recognition system 280 (FIG. 2) to identify particular content, such as the audio signals corresponding to the navigation system 212.

The content of an audio input signal transmitted by the wireless telephone 214 may include ancillary or meta information, such as caller-identification information. The signal analyzer 110 may recognize that the driver should receive the call. In this circumstance, the signal analyzer 110 may direct the signal processor 116 to transmit the corresponding processed audio signal only to the front-left loudspeaker 260. The signal processor 216 may mute the other speakers.

A plurality of identified caller numbers and/or a plurality of dialed numbers may be stored in a table or other memory. Each stored number may correspond to a particular occupant position in the vehicle. For example, a plurality of telephone numbers identified by caller-identification may correspond to friends, family or acquaintances of the driver. When the signal analyzer 110 identifies such a telephone number, the signal analyzer 110 may direct the signal processor 116 to route the audio signal corresponding to the wireless telephone 214 only to the front-left 260 or "driver's side" loudspeaker. The processed audio signal 254 may also be modified with respect to volume and tone. Similarly, other dialed-in telephone numbers may correspond to a particular occupant position. Accordingly, when the signal analyzer 110 identifies a dialed-in telephone number corresponding, for example, to the occupant in the left-rear seat, the signal analyzer 110 may direct the signal processor 116 to route the audio signal corresponding to the wireless telephone 214 only to the left-rear loudspeaker 264.

The parking assistance system 230 may transmit parking instructions to the driver to assist the driver when parking the vehicle, in particular when parallel parking. The parking assistance system 230 may transmit specific information to the signal analyzer 110 regarding distance measurements obtained during the parking process. For example, the signal processor 116 may direct the processed audio signal to the loudspeaker closest to the driver (the front-left loudspeaker 260) depending upon the distance measurements obtained. If the signal processor receives information, such as that only minimal parking distance remains, the signal processor may direct the processed audio signal to a different loudspeaker. This may provide the driver with perceptual cues to aid in the parking process.

Figure 5:
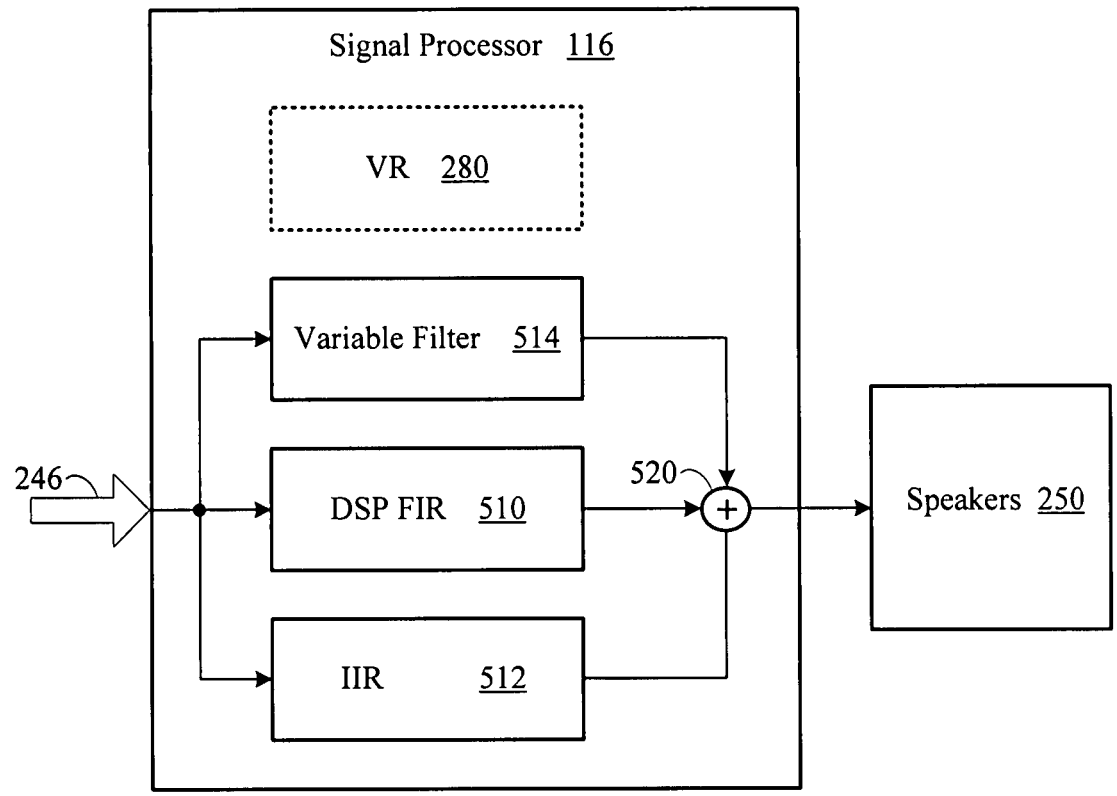
FIG. 5 is a signal processor.

FIG. 5 shows the signal processor 116 having a plurality of filters or digital signal processors. The digital signal processors may include a finite impulse response filter 510, an infinite impulse response filter 512 and/or a time variable filter 514. A summing circuit 520 may sum the output of the filters. One or more of the filters may provide certain acoustic effects, such as reverberation. Alternatively, a pre-determined filter may be assigned to process a particular audio input signal, while a different filter may be designated to process a different audio input signal. Alternatively, a pre-determined filter may be assigned to provide output signals directed to a particular loudspeaker, while a different filter may be assigned to provide output signals to a different loudspeaker. Further, a pre-determined filter may be assigned to process certain audio signals depending upon the content information provided by the audio processing system 110.

The signal processor 116 and/or the filters may provide a virtual loudspeaker effect, which may cause the occupants to perceive the loudspeaker output from a specific spatial position in the vehicle. The perceived position of the virtual loudspeaker may be moveable. The spatial position of the virtual loudspeaker may be based on the content and/or source of the audio input signal. For example, if the content of an audio input signal transmitted by the navigation system 212 indicates "turn left," the signal processor 116 may cause a virtual loudspeaker to be simulated by the left-hand driver's side. Alternatively, the virtual loudspeaker may appear to move in the vehicle at a pre-determined velocity or in a specific direction.

Figure 6:
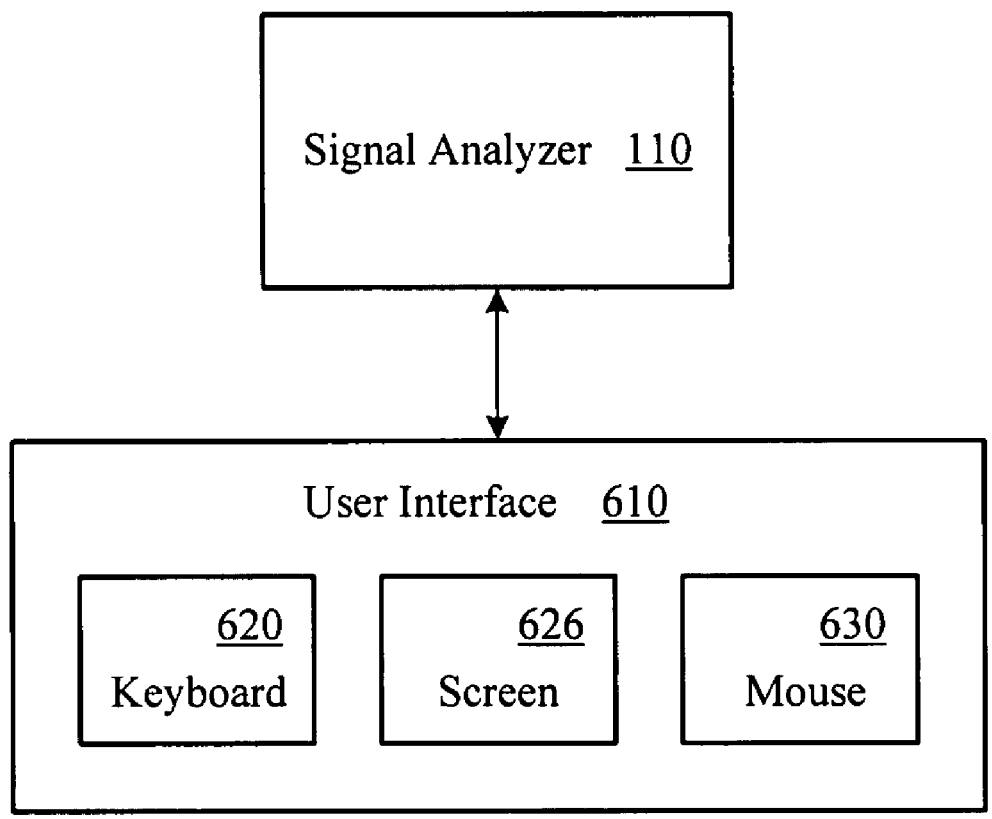
FIG. 6 is a user interface.

FIG. 6 is a user interface 610. The driver or other occupants may manually configure or program the signal analyzer 110 or signal processor 116 through the user interface 610. The user interface 610 may include a keyboard 620, a display screen 626 and a mouse 630 or other input device. The driver or other occupants may configure or program the signal analyzer 110 or signal processor 116 using voice commands through a microphone 282 (FIG. 2) connected to the voice recognition system 280. Each occupant position in the vehicle may have its own user interface 610. The components of the audio processing system 110 may be connected to each other by a cable or by a wireless connection. The wireless connection may be implemented using, for example, a wireless local area network (WLAN) or a Bluetooth® decoder or other wireless transceiver.

Figure 7:
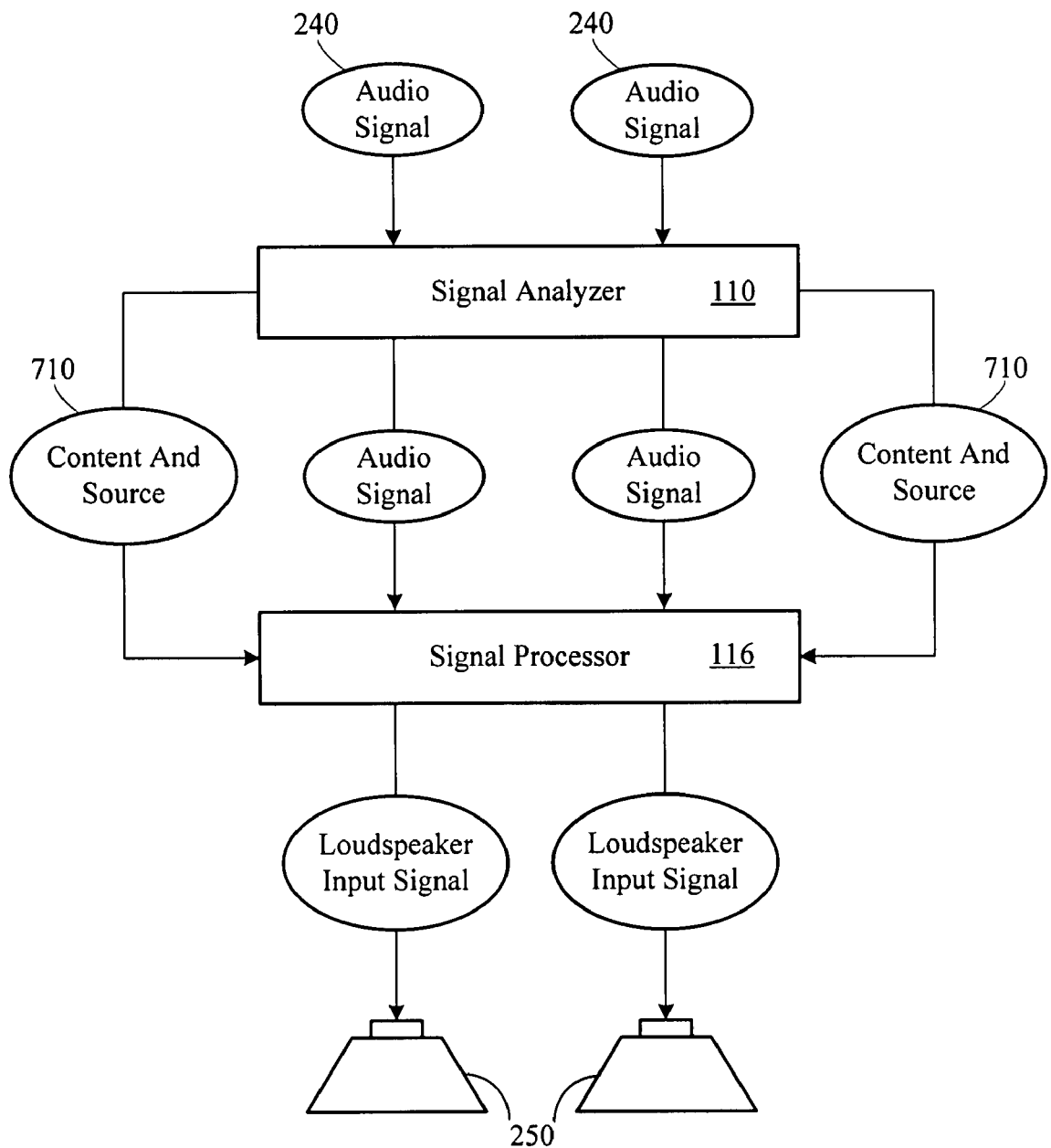
FIG. 7 is a process control with separate source and content.

FIG. 7 is a data flow diagram. The signal analyzer 110 may receive the audio input signals 240 and may output the signals as analyzed audio signals to the signal processor 116. The signal analyzer 110 may also output additional signals to the signal processor 116 corresponding to the source and content 710 of the audio input signals 240. The signal analyzer 110 may analyze the audio input signals 240 and output such signals to the signal processor 116. The signal processor 116 may distinguish between the original or unmodified audio input signal 250 and the additional signal 710 containing the content and source information.

Figure 8:
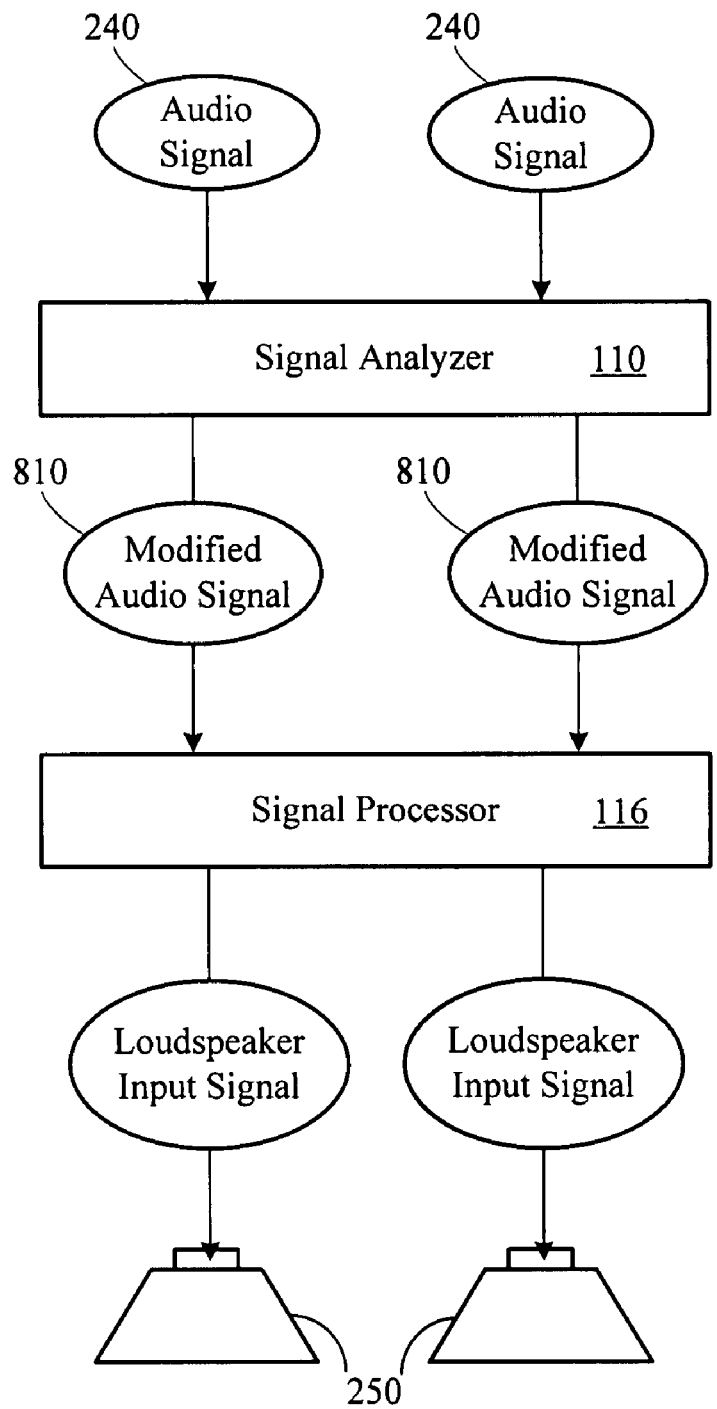
FIG. 8 is a process control with combined source and content.

FIG. 8 is a data flow diagram. The signal analyzer 110 may determine the source and content of the audio input signals 240. After determining the source and content, the signal analyzer 110 may modify the audio input signals and send the modified signals 810 to the signal processor. The modified signals or processed audio signals 810 may include the source and content information determined by the signal analyzer 110. The signal processor 116 may decode and evaluate the source and content information and may process each audio input signal before transmission through the loudspeakers.

The logic, circuitry, and processing described above may be encoded in a computer-readable medium such as a CD-ROM, disk, flash memory, RAM or ROM, an electromagnetic signal, or other machine-readable medium as instructions for execution by a processor. Alternatively or additionally, the logic may be implemented as analog or digital logic using hardware, such as one or more integrated circuits (including amplifiers, adders, delays, and filters), or one or more processors executing amplification, adding, delaying, and filtering instructions; or in software in an application programming interface (API) or in a Dynamic Link Library (DLL), functions available in a shared memory or defined as local or remote procedure calls; or as a combination of hardware and software.

The logic may be represented in (e.g., stored on or in) a computer-readable medium, machine-readable medium, propagated-signal medium, and/or signal-bearing medium. The media may comprise any device that contains, stores, communicates, propagates, or transports executable instructions for use by or in connection with an instruction executable system, apparatus, or device. The machine-readable medium may selectively be, but is not limited to, an electronic, magnetic, optical, electromagnetic, or infrared signal or a semiconductor system, apparatus, device, or propagation medium. A non-exhaustive list of examples of a machine-readable medium includes: a magnetic or optical disk, a volatile memory such as a Random Access Memory "RAM," a Read-Only Memory "ROM," an Erasable Programmable Read-Only Memory (i.e., EPROM) or Flash memory, or an optical fiber. A machine-readable medium may also include a tangible medium upon which executable instructions are printed, as the logic may be electronically stored as an image or in another format (e.g., through an optical scan), then compiled, and/or interpreted or otherwise processed. The processed medium may then be stored in a computer and/or machine memory.

The systems may include additional or different logic and may be implemented in many different ways. A controller may be implemented as a microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions and thresholds) and other data structures may be separately stored and managed, may be incorporated into a single memory or database, or may be logically and physically organized in many different ways. Programs and instruction sets may be parts of a single program, separate programs, or distributed across several memories and processors. The systems may be included in a wide variety of electronic devices, including a cellular phone, a headset, a hands-free set, a speakerphone, communication interface, or an infotainment system.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. An audio processing system for controlling an audio input signal provided by an audio source device, the system comprising:
    a signal analyzer configured to determine content information and source information corresponding to the audio input signal, and generate an analyzed audio signal, where a class is assigned to the analyzed audio signal;
    a signal processor configured to receive the analyzed audio signal and generate a processed audio signal based on the content information and/or source information from the signal analyzer unless based upon the class the signal processor determines that the analyzed audio signal is to be delayed; and
    the signal processor outputting the processed audio signal that was delayed to one or more loudspeakers.

2. The system of claim 1, further comprising a loudspeaker system having at least one loudspeaker mounted in the vehicle, the at least one loudspeaker configured to receive the processed audio signal.

3. The system of claim 1, where the audio source device is a navigation system and the audio input signal contains route guidance information.

4. The system of claim 3, where the content of the audio signal comprises route guidance information having directional components, and the signal processor controls a volume level of the processed audio signal output to two or more loudspeakers utilizing the directional components.

5. The system of claim 1, where the audio source device is a wireless telephone and the audio input signal is a wireless telephone signal.

6. The system of claim 1, where the signal analyzer is configured to simultaneously receive a plurality of audio input signals from respective audio source devices.

7. The system of claim. 1, where the signal processor is configured to set a volume level corresponding to the received analyzed audio signal and output the processed audio signal to at least one loudspeaker in accordance with the set volume level.

8. The system of claim 1, where the signal processor is configured to modify a pitch of the received analyzed audio signal and output the processed audio signal to at least one loudspeaker.

9. The system of claim 1, where the signal processor is configured to output a processed audio signal to one of the loudspeakers at a first volume level, and output the, processed audio signal to a different one of the loudspeakers at a second volume level.

10. The system of claim 1, where the signal, processor provides a virtual loudspeaker effect located at a predetermined spatial position.

11. The system of claim 10, where the content of the audio signal comprises route guidance information having directional components, and the signal processor controls the spatial position based on the directional components.

12. The system of claim 10, where the predetermined spatial position changes over a predetermined period of time.

13. The system of claim 10, where the signal analyzer and/or the signal processor is configured to be adjusted by at least one occupant of the vehicle.

14. A method for controlling an audio signal provided by an audio source device, comprising:
    providing at least one audio input signal;
    determining content information and source information corresponding to the audio signal and generating an analyzed audio signal, where a class is assigned to the analyzed audio signal;

processing the analyzed audio signal based upon the content information and the source information to generate a processed audio signal unless based upon the class the analyzed audio signal is to be delay; and outputting the processed audio signal that was delayed to one or more loudspeakers.

15. The method of claim 14, further comprising outputting the processed audio signal to a loudspeaker system mounted in a vehicle, the loudspeaker system, having a plurality of loudspeakers.

16. The method of claim 14, further comprising receiving the audio input signal containing route guidance information, the audio input signal received from a navigation system.

17. The method of claim 14, further comprising controlling a volume level of the processed audio signal and outputting the processed audio signal to two or more loudspeakers utilizing the directional components contained in the route guidance information.

18. The method of claim 14, further comprising receiving the audio input signal from a source device selected from the group consisting of a navigation device, wireless telephone, radio, CD player, DVD player, vehicle warning/alert system and vehicle parking assistance system.

19. The method of claim 14, further comprising simultaneously receiving a plurality of audio input signals from respective audio source devices.

20. The method of claim 14, further comprising modifying a pitch of the analyzed audio signal and outputting the processed audio signal to at least one loudspeaker in accordance with the modified pitch.

21. The method of claim 14, further comprising adding a reverberation effect to the analyzed audio signal and outputting the processed audio signal to at least one loudspeaker in accordance with the added reverberation effect.

22. The method of claim 14, further comprising outputting a processed audio signal to one of the loudspeakers at a first volume level, and outputting the processed audio signal to a different one of the loudspeakers at a second volume level.

23. The method of claim 14, further comprising controlling the spatial position based on directional components contained in route guidance information.

24. The method of claim 14, further comprising changing the spatial position over a predetermined period of time.

25. A computer-readable storage medium having processor executable instructions to control an audio signal provided by an audio source device by performing the acts of:

providing at least one audio input signal;

determining content information and source information corresponding to the audio signal and generating an analyzed audio signal, where a class is assigned to the analyzed audio signal;

processing the analyzed audio signal based upon the content information and the source information to generate a processed audio signal unless based upon the class the analyzed audio signal is to be delayed; and outputting the processed audio signal that was delayed to one or more loudspeakers.

* * * * *